United States Patent
Cook

(10) Patent No.: US 8,291,991 B1
(45) Date of Patent: Oct. 23, 2012

(54) WALK-BEHIND SOIL AERATOR

(75) Inventor: David M. Cook, Prospect, KY (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/644,335

(22) Filed: Dec. 22, 2009

(51) Int. Cl.
*A01B 45/00* (2006.01)

(52) U.S. Cl. ............. 172/21; 172/125; 172/118; 172/42

(58) Field of Classification Search ............... 172/21, 172/22, 125, 42, 43, 48, 51, 540, 118, 119, 172/120, 121, 122, 123
See application file for complete search history.

(56) References Cited

U.S. PATENT DOCUMENTS

| | | | |
|---|---|---|---|
| 197,204 A | 11/1877 | Concannon et al. | |
| 1,122,481 A | 12/1914 | Cowart | |
| 1,130,366 A | 3/1915 | Babcock | |
| 1,157,670 A | 10/1915 | Boswell | |
| 1,195,397 A | 8/1916 | Reed | |
| 1,576,862 A | 3/1926 | Snow | |
| 1,778,334 A | 10/1930 | Pedersen | |
| 1,843,095 A | 1/1932 | Urschel | |
| 2,117,065 A | 5/1938 | Lassas | |
| 2,154,720 A | 4/1939 | Biles | |
| 2,164,845 A | 7/1939 | Steed et al. | |
| 2,205,997 A | 6/1940 | Wallace et al. | |
| 2,229,497 A * | 1/1941 | Dontje | 172/21 |
| 2,234,534 A | 3/1941 | Reno | |
| 2,260,110 A | 10/1941 | Blohm | |
| 2,401,796 A | 6/1946 | Raitch | |
| 2,450,749 A | 10/1948 | Clark | |
| 2,601,752 A | 7/1952 | Rose | |
| 2,619,887 A | 12/1952 | Burrows | |
| 2,649,061 A | 8/1953 | Hawkins et al. | |
| 2,675,750 A | 4/1954 | Boyer | |
| 2,713,816 A | 7/1955 | Berg | |
| 2,750,859 A | 6/1956 | Smithburn | |
| 2,823,597 A | 2/1958 | Kelsey | |
| 2,835,182 A | 5/1958 | Smithburn | |
| 2,888,994 A | 6/1959 | Hoff et al. | |
| 3,429,378 A | 2/1969 | Mascaro | |
| 3,675,724 A | 7/1972 | Schneider | |
| 3,746,101 A | 7/1973 | Takata | |
| 3,889,761 A | 6/1975 | Rogers | |
| 3,946,543 A | 3/1976 | Templeton | |
| 3,992,858 A | 11/1976 | Hubbard et al. | |
| 4,037,544 A | 7/1977 | Cantone | |
| 4,192,387 A * | 3/1980 | Stinson | 172/21 |

(Continued)

FOREIGN PATENT DOCUMENTS

CA 366396 5/1937

(Continued)

*Primary Examiner* — Jamie L McGowan
(74) *Attorney, Agent, or Firm* — Robert H. Eichenberger; Scott W. Higdon; Middleton Reutlinger

(57) ABSTRACT

A walk-behind soil aerator includes an engine, a differential, and left and right tine assemblies driven by the first and second output shafts of the differential, and a variable speed drive means between the engine and the differential, as well as a control means accessible by an operator walking behind the aerator which allows the operator to make tight turns by gradually reducing the speed of the drive means to a desired slow speed in order for the driven tines to drive the aerator through the turn and then gradually increasing the speed of the drive means without having to change the engine speed.

16 Claims, 10 Drawing Sheets

U.S. PATENT DOCUMENTS

| | | | |
|---|---|---|---|
| 4,196,678 A | | 4/1980 | Lore et al. |
| 4,237,983 A | * | 12/1980 | Allen .............................. 172/42 |
| 4,258,634 A | | 3/1981 | Lore et al. |
| 4,336,760 A | * | 6/1982 | Cohen et al. .................. 111/131 |
| 4,438,873 A | | 3/1984 | Kaercher, Jr. |
| 4,483,400 A | * | 11/1984 | Arndt .............................. 172/42 |
| 4,492,271 A | * | 1/1985 | Doering .......................... 172/43 |
| 4,519,459 A | | 5/1985 | Reaume |
| 4,550,783 A | | 11/1985 | Hansen |
| 4,602,687 A | | 7/1986 | Hansen |
| 4,606,411 A | | 8/1986 | Classen |
| 4,606,412 A | | 8/1986 | Classen |
| 4,632,189 A | | 12/1986 | Rizzo |
| 4,645,012 A | | 2/1987 | Hansen et al. |
| 4,750,565 A | | 6/1988 | Hansen et al. |
| 4,753,298 A | | 6/1988 | Hansen et al. |
| 4,773,486 A | * | 9/1988 | Huber et al. ................... 172/22 |
| 4,802,536 A | * | 2/1989 | O'Neal ........................... 172/42 |
| 4,811,794 A | | 3/1989 | Greene |
| 4,867,244 A | | 9/1989 | Cozine et al. |
| 4,926,947 A | | 5/1990 | Cozine et al. |
| 5,009,270 A | | 4/1991 | Vangsgard |
| 5,101,910 A | | 4/1992 | Dawson |
| 5,307,952 A | | 5/1994 | Worrel et al. |
| 5,307,965 A | | 5/1994 | Worrel |
| 5,398,767 A | | 3/1995 | Warke |
| 5,454,433 A | | 10/1995 | Worrel et al. |
| 5,478,104 A | | 12/1995 | Worrel et al. |
| 5,560,432 A | | 10/1996 | Conte |
| 5,571,252 A | | 11/1996 | Worrel et al. |
| 5,673,756 A | | 10/1997 | Classen |
| 5,680,903 A | | 10/1997 | Oliver |
| 5,713,420 A | | 2/1998 | Roberts et al. |
| 5,794,708 A | | 8/1998 | Brophy |
| 5,802,994 A | | 9/1998 | Kinkead et al. |
| 5,890,545 A | | 4/1999 | Smith et al. |
| 6,024,033 A | | 2/2000 | Kinkead et al. |
| 6,058,860 A | | 5/2000 | Kinkead et al. |
| 6,102,129 A | | 8/2000 | Classen |
| 6,149,079 A | | 11/2000 | Kinkead et al. |
| 6,179,061 B1 | | 1/2001 | Fiore |
| 6,241,025 B1 | | 6/2001 | Myers et al. |
| 6,273,197 B1 | | 8/2001 | Marlow |
| 6,415,872 B2 | | 7/2002 | Myers et al. |
| 6,585,451 B2 | * | 7/2003 | Wynings ....................... 404/131 |
| 6,684,960 B1 | * | 2/2004 | Ng et al. ......................... 172/22 |
| 6,708,773 B1 | | 3/2004 | Kinkead et al. |
| 6,758,283 B2 | | 7/2004 | Lauer et al. |
| 6,823,947 B2 | | 11/2004 | Nagaoka et al. |
| 6,892,821 B2 | | 5/2005 | Wessel |
| 7,100,702 B2 | | 9/2006 | Classen |
| 7,290,619 B2 | | 11/2007 | Maas et al. |
| 7,341,114 B2 | | 3/2008 | Classen et al. |
| 7,487,842 B2 | | 2/2009 | Classen et al. |
| 7,540,102 B2 | * | 6/2009 | Olmr et al. ...................... 37/245 |
| 7,591,323 B2 | | 9/2009 | Wynings |
| 2004/0245000 A1 | * | 12/2004 | Lauer et al. ..................... 172/21 |
| 2004/0256120 A1 | * | 12/2004 | Oota ............................... 172/42 |

FOREIGN PATENT DOCUMENTS

| | | |
|---|---|---|
| EP | 0140989 | 5/1985 |
| EP | 0870420 | 10/1998 |
| GB | 191004201 | 0/1910 |
| GB | 191029804 | 0/1911 |
| GB | 143999 | 3/1919 |
| GB | 472443 | 9/1937 |
| GB | 644801 | 10/1950 |
| GB | 2347400 | 9/2000 |
| JP | 8318745 | 12/1996 |
| JP | 2003180107 | 7/2003 |

* cited by examiner

WALK-BEHIND SOIL AERATOR

BACKGROUND

The present invention relates to a soil aerator. More particularly, it relates to a walk-behind soil aerator, which has rotating aerator tines that are driven by an engine.

Several different types of soil aerators with rotating tines are known. On all these aerators, the tines are mounted on shafts for rotation about an axis, and, as each tine rotates, it pierces the ground and pulls up a plug of soil.

The fact that the aerator tines dig into the soil makes aerators much more difficult to maneuver than a typical piece of lawn equipment, like a lawn mower, which remains entirely on top of the ground, because the tines that are sticking into the ground limit the ability of the aerator to move along the ground. As a result, aerators generally travel in a straight line, have a very large turning radius and are very difficult to handle. Each type of aerator uses a somewhat different mechanism for reducing the interference of the tines when making a turn.

First, there are aerators that are pulled behind a tractor. The tines on these aerators are not driven. They simply free-wheel about a shaft as the aerator frame is pulled along by the tractor. These aerators typically include several different tine assemblies mounted for freewheeling about a single shaft. These aerators can make wide turns, with the individual tine assemblies free-wheeling at varying speeds to accommodate the turning aerator as the tractor pulls the aerator along. There still may be some resistance and some dragging of tines that are inserted into the soil as the aerator is pulled around a curve, which can tear up turf and is undesirable, but, if a large enough radius of curvature is used, the result is generally acceptable.

Next, there are walk-behind aerators, which include a frame with an internal combustion engine which typically uses a belt drive (or drives) to drive the tine assemblies. The driven tines dig into the soil and propel the aerator forward along the ground as they rotate, with the human operator walking behind the aerator to steer it and control it. Some of these aerators can be driven around curves if a large radius of curvature is used, particularly if they use a differential to enable the outer tines to rotate at a faster speed than the inner tines while the tine assemblies are being driven. However, they rely on the use of a clutch to disengage the drive to the aerator tines so the tine assemblies become freewheeling in order to reduce the amount of interference from the tines when the operator wants to make a tight turn or wants to pull the aerator backwards.

Finally, there are large, riding aerators, on which the operator stands or sits. These riding aerators typically have separate, left and right hydrostatic drives, which separately drive left and right sets of tine assemblies. The operator may speed up one set of rotating tines and slow down another to make a wide turn. To make sharp turns, the operator stops the aerator, raises the tines out of the ground to get them completely out of the way, then drives the aerator to the desired position, then stops and lowers the tines back into the ground and then begins driving the tines again.

So, as explained above, all the aerators rely on some mechanism to get the tines out of the way in order to be able to make tight turns or other difficult maneuvers—either allowing the tine assemblies to freewheel or raising the tine assemblies entirely out of the ground during the difficult maneuver.

The aerator described by Kinkead in U.S. Pat. No. 6,708,773 is an example of a walk-behind aerator which uses a belt drive with a clutch mechanism that allows the operator to disengage the drive and allow the tines to freewheel during difficult maneuvers. It additionally facilitates turning by driving the left and right sets of tines through a differential, and through the use of left side and right side individual brakes, to manually overcome the resistance associated with making wide turns while the tines are in the ground, as described below. However, this arrangement is still very difficult for the operator to maneuver.

If the operator wants to make a large radius turn, he either pulls back on the handle on one side of the aerator or uses a brake to slow down the tines on one side of the aerator while pushing on the other side to direct the aerator into the turn. Due to the way a differential works, when the inner set of tines is moving very slowly or is stationary, the outer set of tines rotates at twice the normal speed, so the operator often finds himself running to keep up with the aerator as it makes the wide turn.

If the operator wants to make a tight turn, he disengages the clutch to make the tines freewheeling to minimize their interference with the maneuver, and then he pushes the aerator manually around the tight turn. After completing the tight turn, he re-engages the clutch, which causes the aerator to jerk forward as the tines begin driving again.

If the operator wants to back up this walk-behind aerator, he again disengages the clutch to make the tines freewheeling, and he then manually pulls the aerator backwards. This can require a substantial amount of human strength, especially if it involves pulling the aerator uphill, which even may be impossible in some situations.

SUMMARY

The present invention provides a walk-behind aerator which operates on a different principle from other walk-behind aerators. Unlike the other aerators, it does not rely on the ability to disengage the tine assemblies to make them freewheeling or to lift them up out of the ground to minimize their interference when backing up or making a tight turn. Instead, it takes an entirely different approach.

Instead of trying to get the tines out of the way when making a tight turn or backing up, it relies on the combination of a variable speed reversible drive between the engine and the tines and the use of a differential between the left and right sets of tine assemblies to give the operator the ability to closely control the speed and direction in which the tines are driven so he can actually use the driving tines to facilitate the desired maneuver. Thus, in this invention, unlike previous aerators, the driving of the tine assemblies is used beneficially to facilitate making a tight turn or other difficult maneuver.

In a preferred embodiment described herein, the engine drives a variable speed reversible hydrostatic drive that drives a differential, which, in turn, drives left and right sets of aerator tine assemblies. This arrangement enables the operator to closely control the speed and direction in which the tines are driven without having to adjust the engine speed.

In the embodiment that is shown and described herein, the variable speed drive is an integrated hydrostatic drive with a variable displacement hydraulic pump and hydraulic motor driving a differential which drives first and second output shafts. A swash plate with a single manual control enables the operator to continuously adjust the speed at which the tine assemblies are driven by the engine in the forward direction and to reverse the direction in which the tines are driven while the engine operates at a constant speed.

An operator walking behind the aerator may make a very tight turn simply by adjusting the speed control to gradually slow down the aerator while he is walking behind the aerator, holding back on one side of the aerator handle (or applying a brake on one side), and allowing the differential to drive the "outside" set of tines at a comfortable, slow speed while the "inside" tines remain substantially stationary, so the aerator easily makes the tight turn. When the turn is completed, the operator then adjusts the same speed control to gradually increase the speed of the aerator tines.

There is no jerking, no concern about killing the engine, and no need to run to keep up with an aerator that is speeding around a turn or causing unsightly turf damage due to the nature of a high speed turn while aerating.

The operator also can reverse the direction in which the tines are driven in order to drive the aerator backwards by adjusting the same control to further adjust the position of the swash plate. It is no longer necessary to disengage the drive and use brute force to pull the aerator in reverse while the tines are freewheeling.

DESCRIPTION

Figure 1:
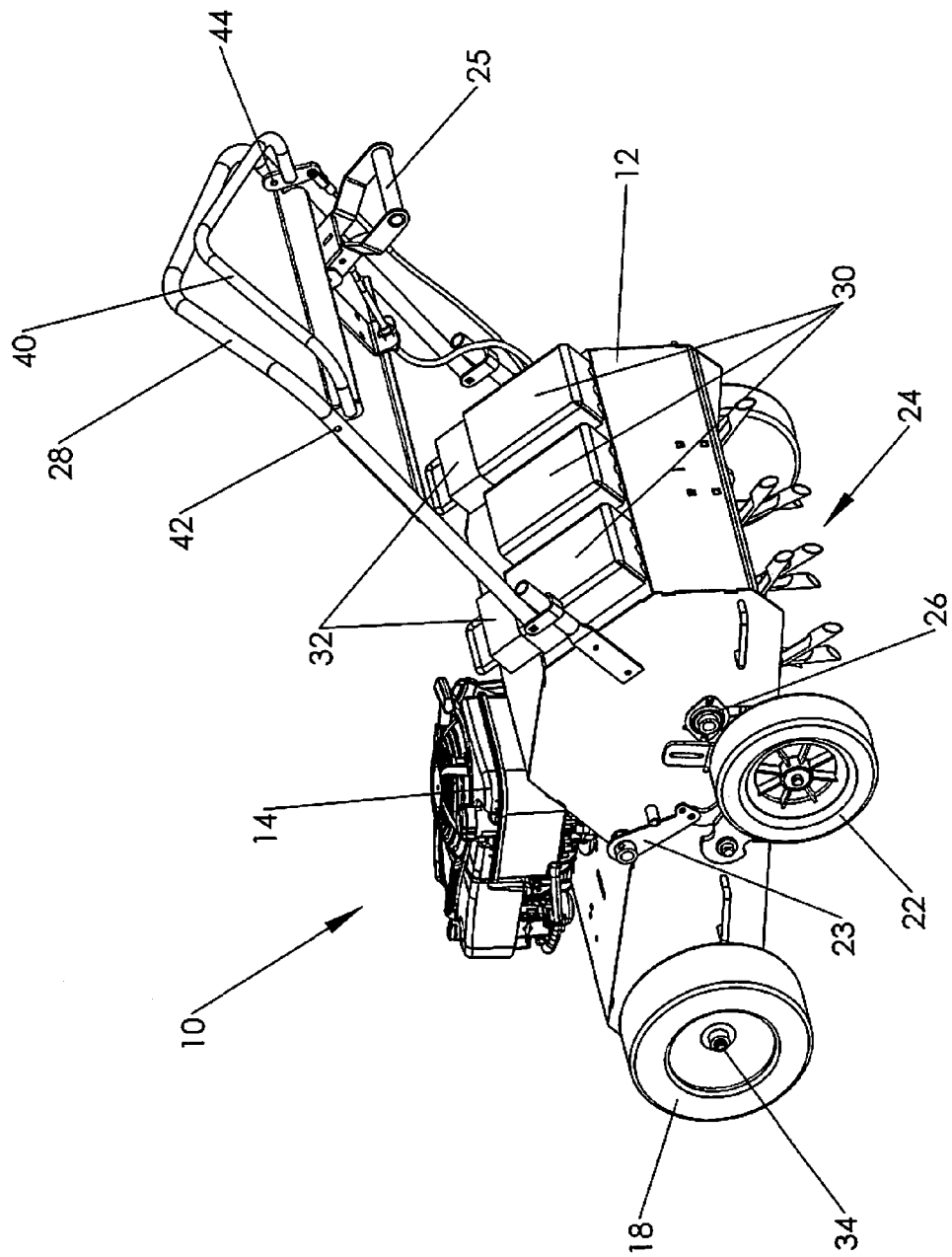
FIG. 1 is a left rear perspective view of an embodiment of walk-behind aerator made in accordance with the present invention.
Figure 2:
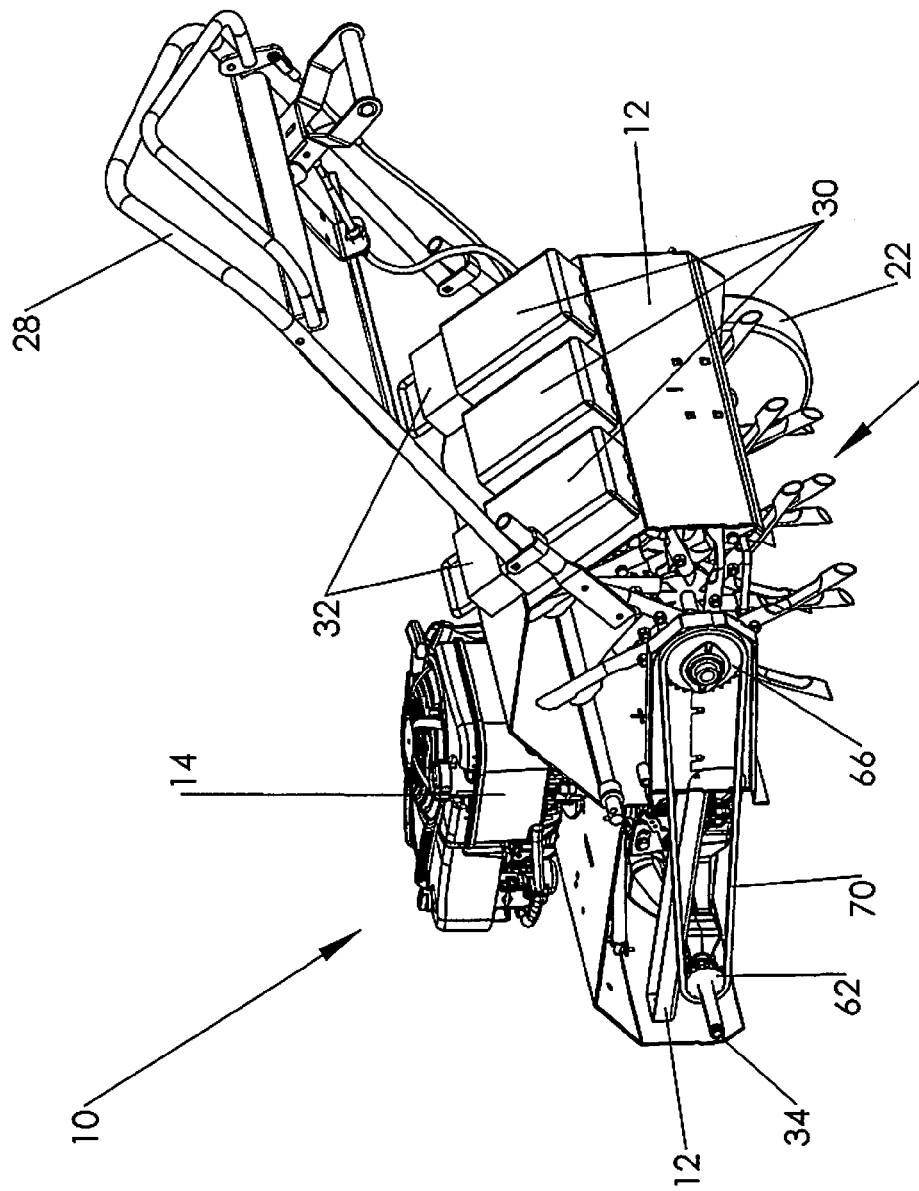
FIG. 2 is the same view as FIG. 1 but with the left side wheels and some of the covers removed or broken away to show some of the inner components of the aerator.

FIGS. 1-9 show one embodiment of a walk-behind soil aerator 10 made in accordance with the present invention. The aerator 10 includes a frame 12, having front, rear, left and right sides, on which is mounted an engine 14. There are left and right front wheels 18 and left and right rear wheels 22, which support the frame 12. The rear wheels 22 include a height adjustment mechanism 23, which enables them to be raised and lowered relative to the frame 12 by moving a handle 25. Several sets of rotating tines 24 are mounted on the frame 12 for rotation about an axis 26.

Figure 4:
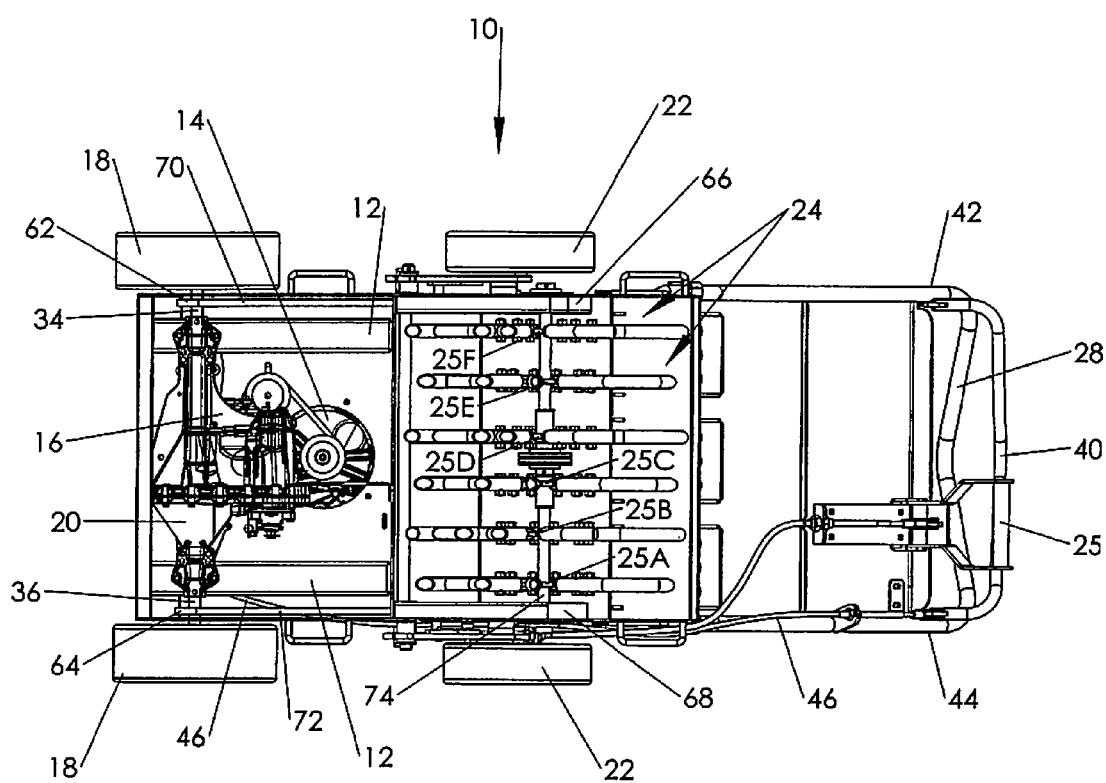
FIG. 4 is a bottom view of the aerator of FIG. 1.
Figure 8:
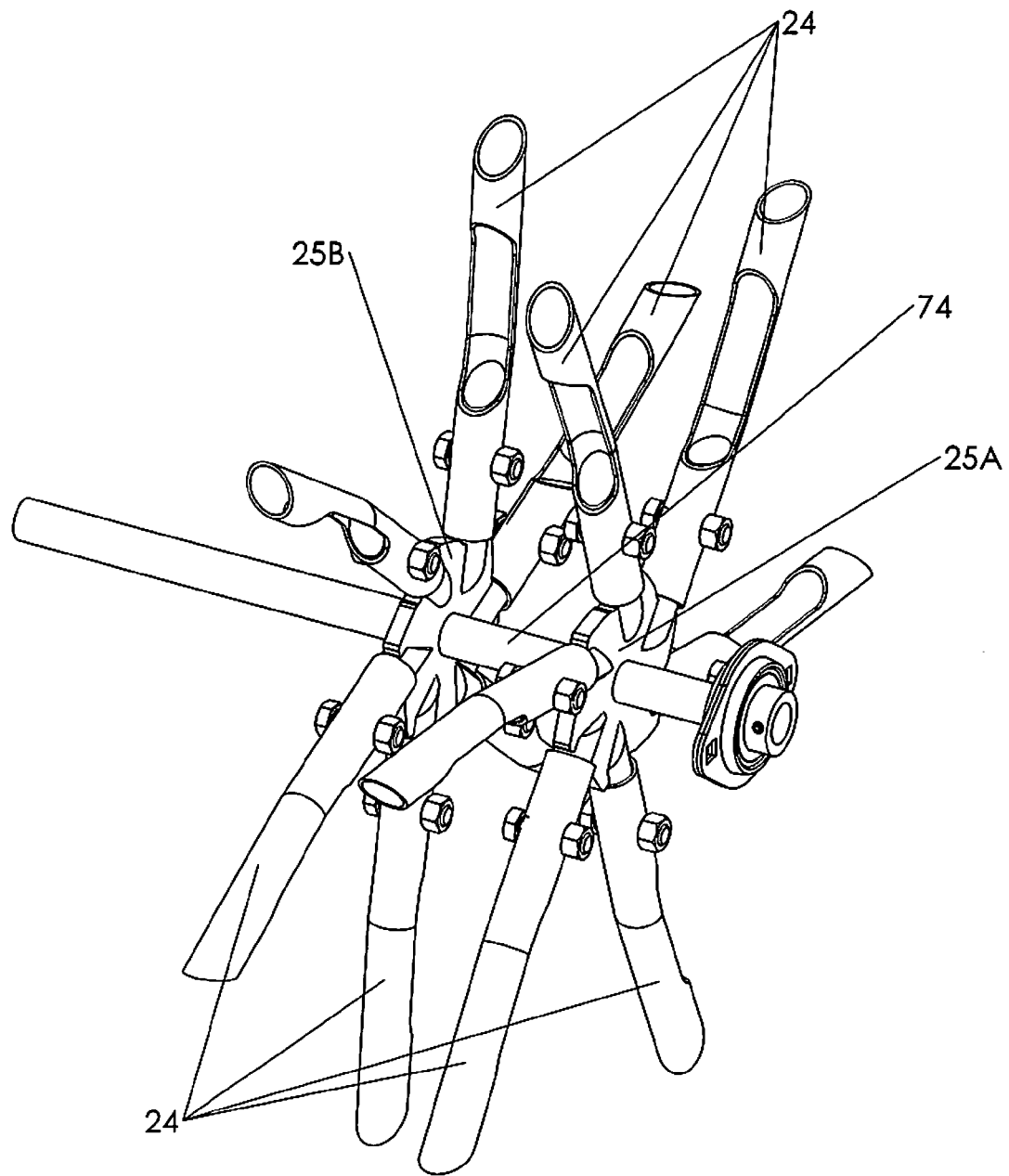
FIG. 8 is a perspective view of one of the tine disk assemblies seen in FIG. 4.
Figure 9:
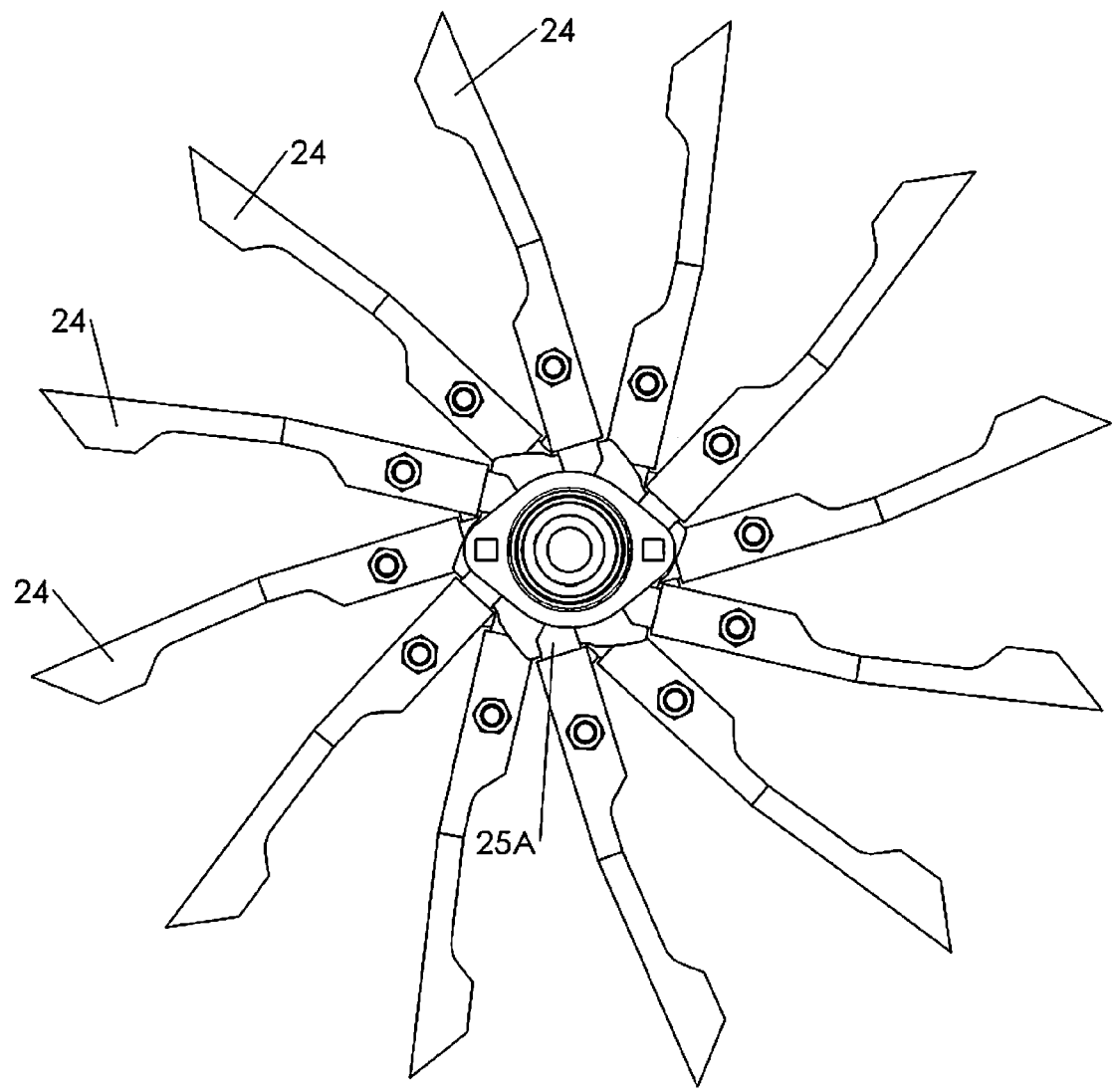
FIG. 9 is an end view of the tine disk assembly of FIG. 8.

FIG. 4 shows six tine disks 25A-F mounted for rotation along a single axis. As shown in FIG. 8, each tine disk 25 has six radially extending tines 24. The two tine disks 25A, 25B on the farthest right are mounted on a common shaft and are driven together, with the disks being angularly offset from each other so only a single tine 24 will be in the ground at any one time, as shown in FIG. 9. The two tine disks 25E, 25F on the farthest left also are mounted on a common shaft and are driven together, with the disks being angularly offset from each other—a mirror image of the farthest right disks 25A, 25B. Each of the central tine disks 25C, 25D is independently freewheeling for rotation about the same axis as the other tine disks.

A variable speed reversible drive 16 transmits power from the engine 14 to the left and right output shafts 34, 36 through a differential 20. The left output shaft 34 drives the left front wheel 18 and the left tine disk assembly, which includes the two left-most tine disks 25E, 25F. The right output shaft 36 drives the right front wheel 18 and the right tine disk assembly, which includes the two right-most tine disks 25A, 25B.

Figure 3:
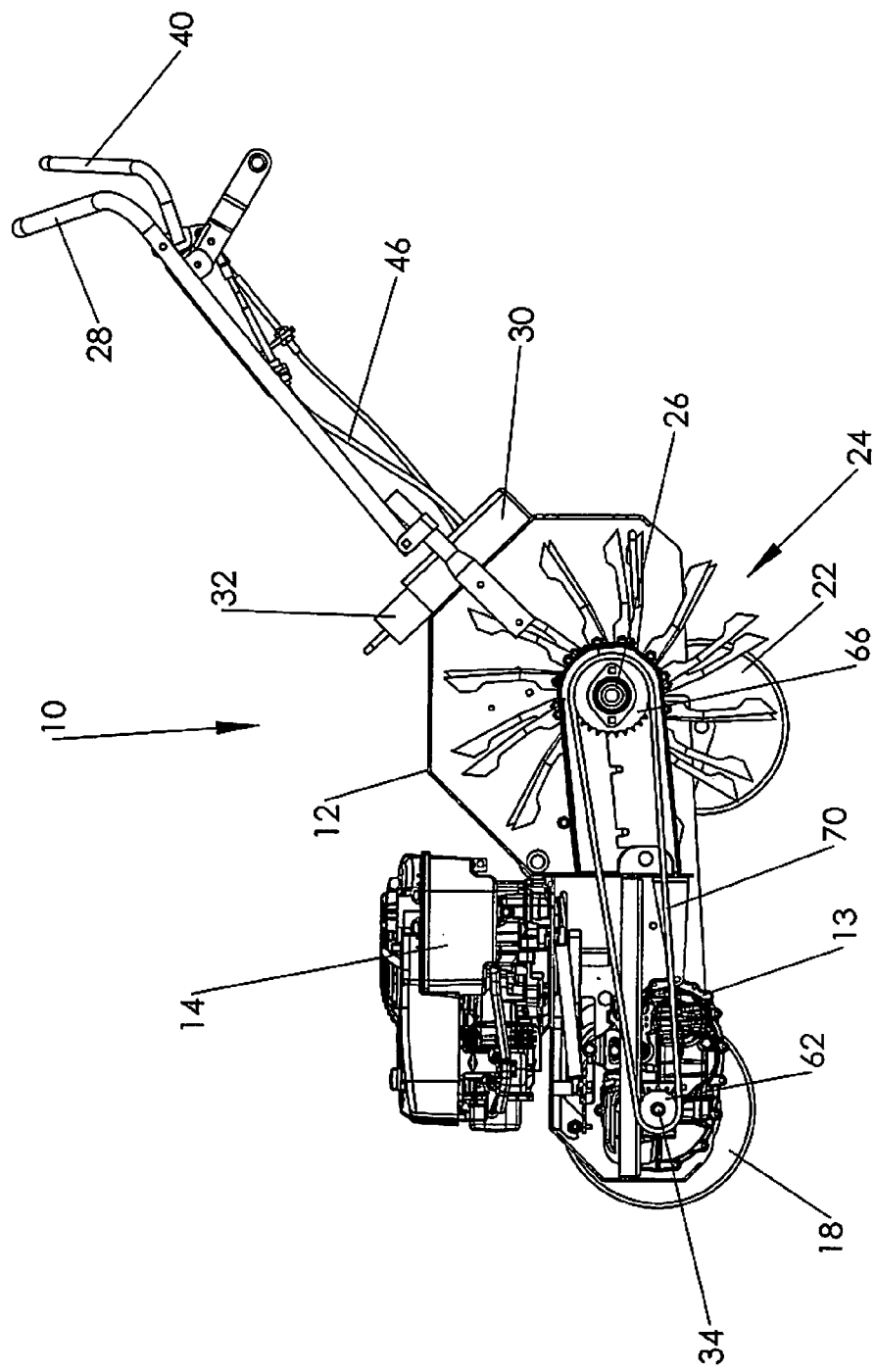
FIG. 3 is a side view of the aerator of FIG. 2.

FIG. 3 shows a drive chain 70 and drive sprocket 66 for transmitting power from the left output shaft 34 to the left tine disk assembly. The right side is a mirror image of this arrangement, with another drive chain 72 and drive sprocket 68 transmitting power from the right output shaft 36 to the right tine disk assembly (including tine disks 25A, 25B mounted on a shaft 74). The right drive sprocket 68 drives a right tine disk shaft 74 on which the tine disks 25A, 25B are mounted.

Also mounted on the frame 12 is a steering handle 28. A speed control lever 40 is pivotably mounted to the steering handle 28.

Metal pockets 30 mounted on the rear of the frame 12 receive weights 32 to help provide force behind the tines 24 so they will punch into the soil rather than lifting up the aerator 10. The number and amount of weights 32 that are used may depend upon the type of soil, with more weight being used for a hard soil that is difficult to pierce, and less weight being used for a soft soil that is easy to pierce.

A belt transmits power from the rotating shaft of the engine 14 to the variable speed reversible drive 16, which, in this case, is an integrated hydrostatic transaxle drive. The operation of one example of an integrated hydrostatic transaxle drive that includes a hydraulic pump, a hydraulic motor, a differential, and first and second output shafts all housed in a single housing is described in U.S. Pat. No. 6,253,637, "Hauser et al.", which is incorporated herein by reference. Various types of integrated hydrostatic transaxle drives are available on the market, and the present embodiment uses an integrated hydrostatic transaxle drive manufactured by Hydro-Gear, of Sullivan, Ill.

The rotating output shaft of the engine 14 drives the variable displacement hydraulic pump (not shown) within the hydrostatic transaxle drive 16, which drives the hydraulic motor (not shown) located within the same housing, which drives the differential 20, also within the same housing, which, in turn, drives the output shafts 34, 36. This integrated hydrostatic transaxle drive 16 uses a swashplate, as shown and described in the Hauser et al. patent, to control the speed and direction of the differential 20, which, in turn, controls the speed and direction of the output shafts 34, 36 without having to change the speed of the engine 14. As is well-known, the differential 20 allows one of the output shafts 34, 36 to be stationary or to be driven at a slower speed, while the other output shaft 36, 34 is driven at a faster speed, which is very helpful when driving around a turn. Of course, for normal operation in a straight line, the differential 20 drives both output shafts 34, 36 at the same speed.

A single control cable 46 controls the angular position of the swash plate which controls the displacement of the hydraulic pump and thus the speed of the hydraulic motor. Moving the swashplate in a first direction gradually reduces the speed of rotation of the hydraulic motor, and in turn, the speed of rotation of the differential, which is driven by the hydraulic motor, so it changes continuously and gradually from a high speed in the forward direction to gradually slower and slower speeds, to a neutral position, at which the drive causes the output shafts 34, 36 to stop rotating, and then to a reverse direction in which the hydraulic motor, differential 20, and output shafts 34, 36 are driven in reverse. Moving the swashplate in the opposite direction reverses that process, going from the reverse direction to the neutral (stopped) position, and then gradually accelerating in the forward direction from a very slow speed to faster speeds.

While this particular embodiment of a hydrostatic drive has the variable displacement hydraulic pump, hydraulic motor, differential, and output shafts all located within a single housing, which makes a compact package, it is not required. Some of the various functional components could alternatively be housed separately.

It should be noted that this type of hydrostatic transaxle drive has been used to drive the wheels of lawn equipment in the past, such as the wheels of self-propelled lawnmowers. However, it has not been used to drive aerator tines as shown here, because, as explained above, it was understood that it was necessary to have a clutch to be able to disengage the tines to make them freewheeling in order to minimize their interference when making tight turns or other difficult maneuvers. The hydrostatic transaxle drive itself does not provide for freewheeling.

Figure 5:
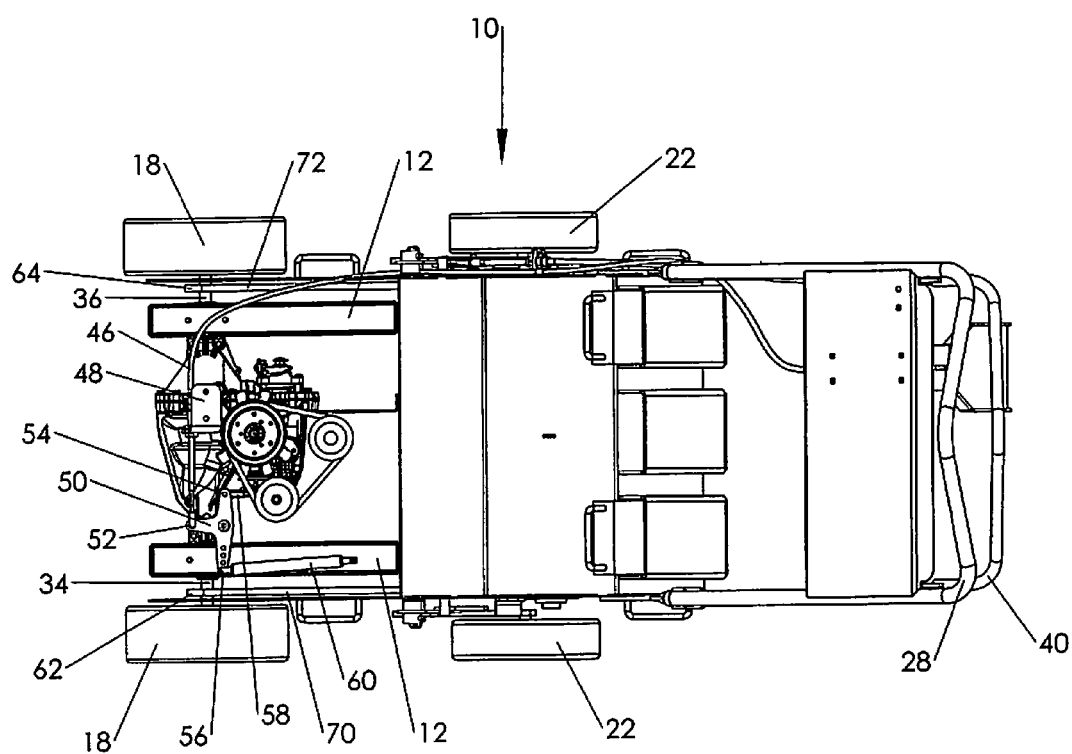
FIG. 5 is a plan view of the aerator of FIG. 1, with some of the covers removed to show some of the inner components.
Figure 5A:
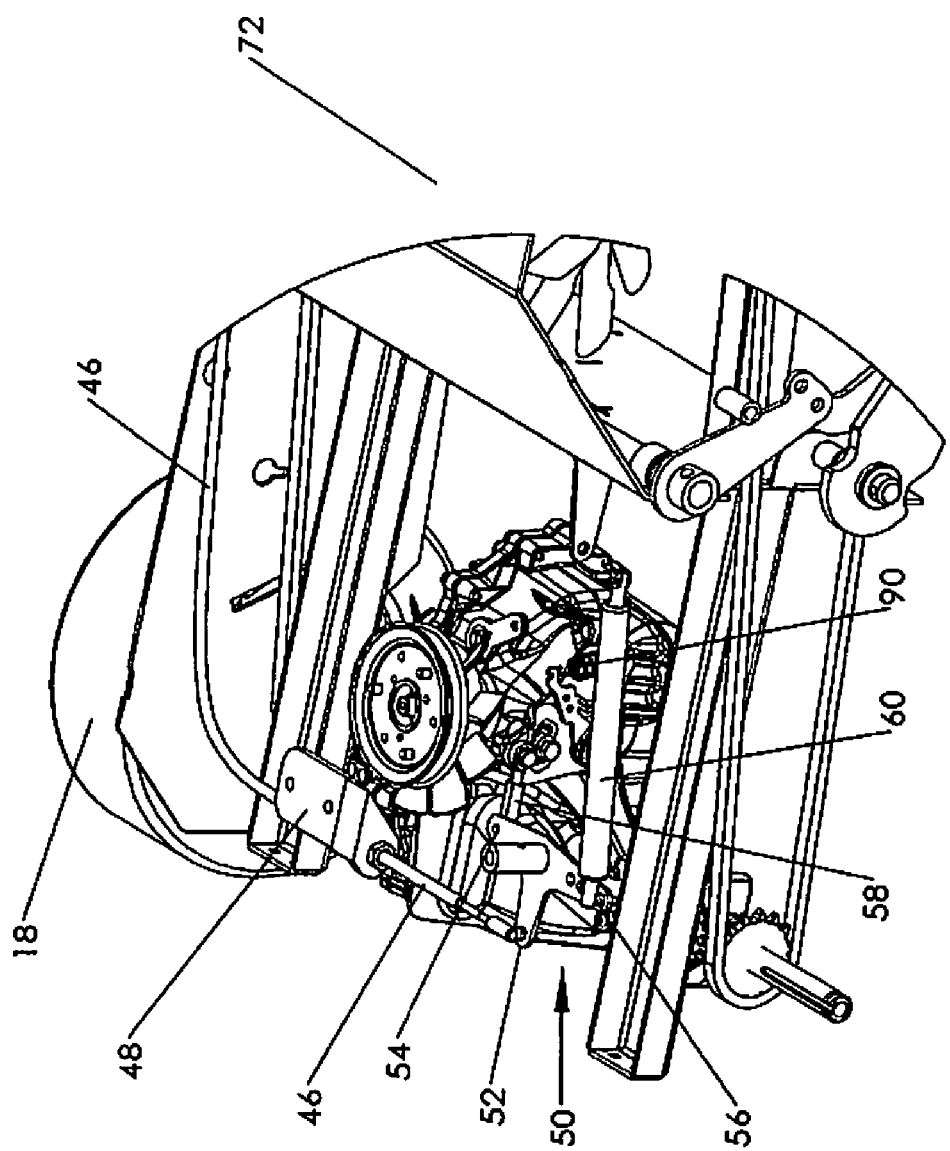
FIG. 5A is an enlarged view of a portion of FIG. 5.
Figure 6:
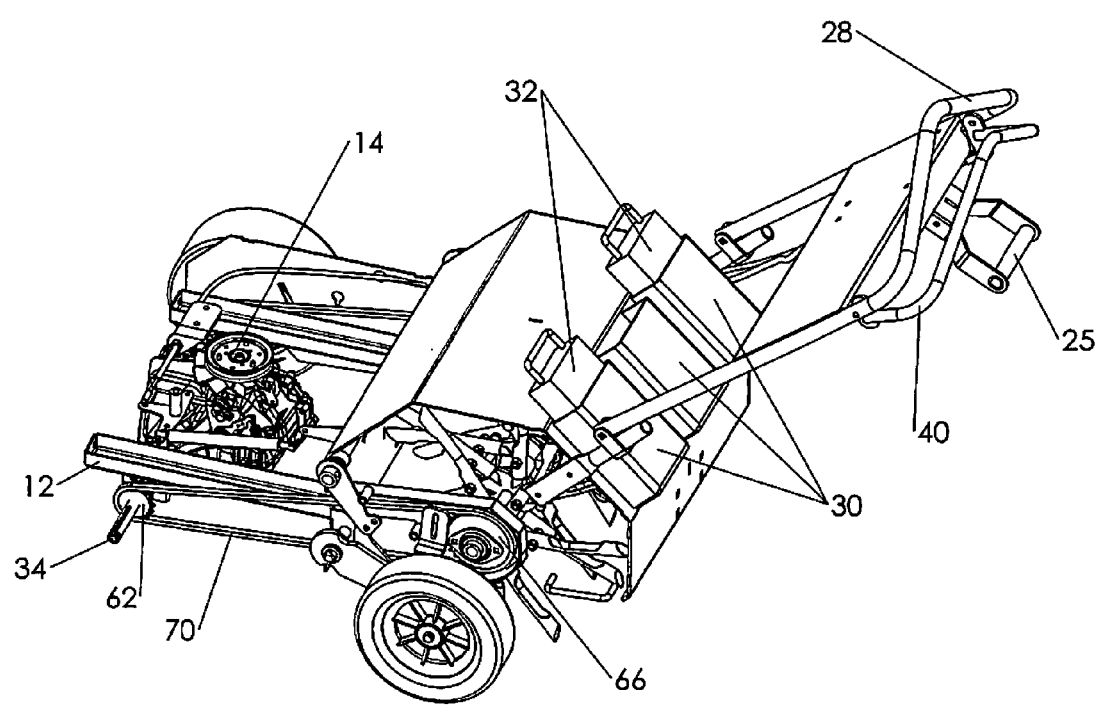
FIG. 6 is a perspective view of the aerator of FIG. 1 with the front left wheel and some of the covers removed.
Figure 7:
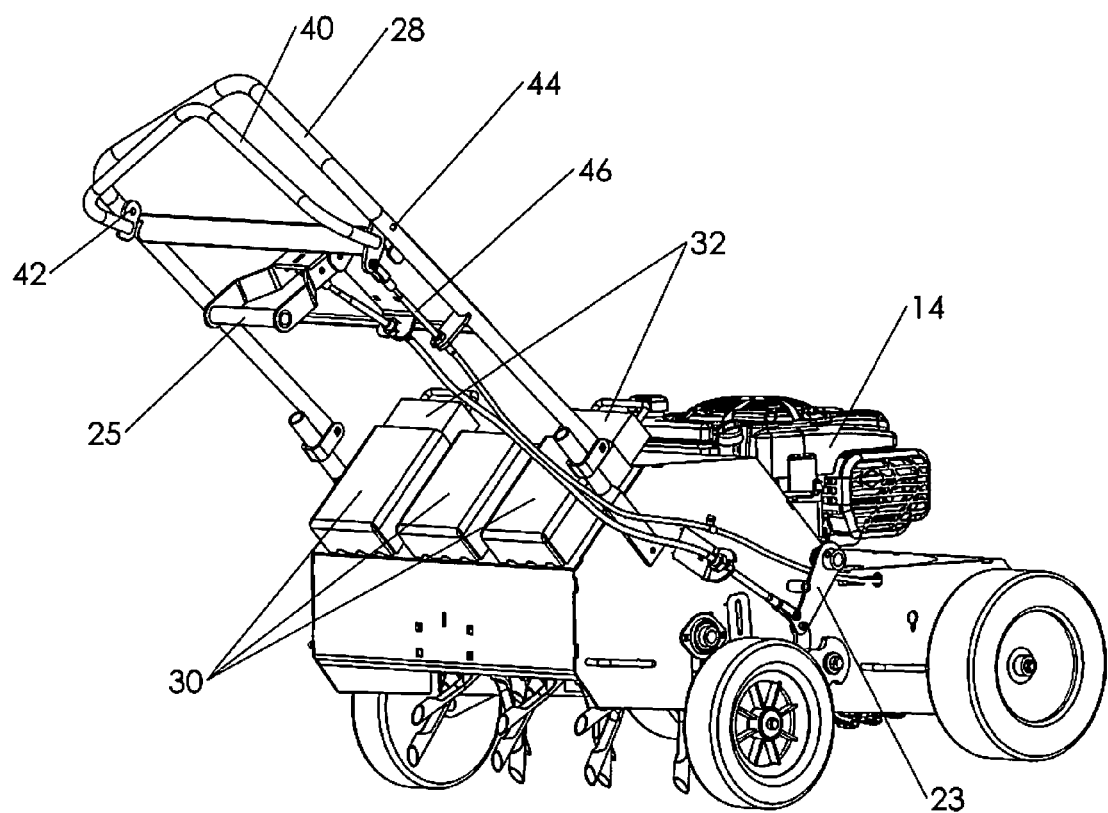
FIG. 7 is a right rear perspective view of the aerator of FIG. 1.

As shown best in FIG. 6, the steering handle 28 has a generally inverted "V" shape, with left and right sides angled rearwardly and downwardly from a central apex. The speed control lever 40 has a similar inverted "V" shape and is pivotably mounted to the steering handle 28 at pivot points 42, 44. A control cable 46 extends from the speed control lever 40 through a bracket 48 (shown in FIG. 5A) and connects to a first leg 52 of a pivoting "T" shaped lever arm 50. A second leg 54 of the lever arm 50 connects to the swashplate (not shown) via a rod 58. The third leg 56 of the lever arm 50 connects to a damper 60.

As the operator grasps the speed control lever 40 and pushes it forward toward the steering handle 28, pivoting the speed control lever 40 about the pivot points 42, 44, he is pulling the cable 46, which then pulls on the first leg 52 of the lever arm 50. This pushes on the rod 58 which is connected to the swashplate, moving the swashplate in a first direction such that the hydraulic pump within the hydrostatic drive 16 drives the hydraulic motor, which drives the differential 20, which drives the first and second output shafts 34, 36, which drive the left and right front wheels 18 and the left and right tine assemblies 25E and F, 25A and B, respectively, so as to propel the aerator 10 in the forward direction. When the operator releases the speed control lever 40, the unit is biased by means of a spring 90 attached to the transaxle, (See FIG. 5A) so as to return the swashplate to the neutral position where there is no output from the hydraulic pump, and the output shafts are stopped. If the operator grasps the speed control lever 40 and pulls back on it, the cable 46 moves in the opposite direction, pushing on the first arm 52 of the lever arm 50, moving the swashplate in a second direction, opposite the first direction, such that the pump drives the hydraulic motor in the reverse direction, which, in turn, drives the differential and the output shafts in the back-up or reverse direction.

This makes the control of the aerator 10 very intuitive and easy for the operator. To go forward, he simply pushes on the speed control lever 40, moving it toward the steering handle 28. The more he pivots the speed control lever 40 forward toward the steering handle 28, the faster the aerator moves forward. To go backwards, he simply pulls back on the speed control lever 40, reducing the speed to the neutral position, and then reversing the direction of the drive. To stop, he simply releases the speed control lever 40 and the biasing spring 90 returns the swashplate to the neutral position where the hydraulic pump provides no output to the hydraulic motor. The ergonomically-designed inverted "V"-shaped steering handle 28 makes steering easy as well by placing the operator's hands and body in position to pull on one side of the steering handle 28 while pushing on the other side of the steering handle 28.

To operate the aerator 10, the operator starts up the engine 14 and raises the rear wheels 22 via the height adjustment lever 25 so that the tine assemblies 24 are resting on the ground. He then grasps the speed control lever 40 and pushes it forward toward the steering handle 28, which moves the swashplate in a first direction (via the cable 46 connected to the lever arm 50) so as to drive the aerator in the forward direction.

To make a tight radius turn, the operator eases up on the speed control lever 40 to slow down the aerator 10. He then holds back on one side of the aerator 10 while pushing on the other side of the aerator 10 to urge the aerator 10 into a turn. The differential in the drive 16 allows the "outside" wheels and tine assembly to rotate while the "inside" wheels and tine assembly remain substantially stationary. The "inside" tine assembly has twin tine disks, but only one core tine 24 of one of the twin tine disks (See FIG. 9) is likely to be fully embedded in the ground at any given time, so the aerator 10 essentially pivots on this embedded core tine as it completes the turn. The middle tine disks 25C, 25D simply free-wheel as required to complete the turn. The "outside" wheels and tine assembly drive forward to assist the operator in making the turn. Once the turn is completed, the operator stops pulling back on the steering handle 28, so the differential transfers power equally to the "inside" and "outside" wheels and tine assemblies to start driving the aerator 10 once again in a straight line. The operator then pushes the speed control lever 40 forward toward the steering handle 28 to speed up the driving for the straight section.

To have the aerator 10 back up, the operator releases the speed control lever 40 such that the biasing spring 90 can return the swashplate to the neutral position wherein the aerator 10 comes to a stop. He then pulls back on the speed control lever 40, pulling it away from the steering handle 28, which moves the swashplate in a second direction, opposite the first direction, to drive the wheels and tines of the aerator 10 in reverse.

It will be obvious to those skilled in the art that modifications may be made to the embodiment described above without departing from the scope of the present invention as claimed.

What is claimed is:

1. A walk-behind soil aerator, comprising:
a frame having front, rear, left and right sides;
a plurality of wheels operatively supporting said frame on the ground;
an engine mounted on the frame;
left and right tine assemblies mounted on the frame, each of said tine assemblies having a plurality of tines thereon;
a differential mounted on the frame, said differential having first and second output shafts which rotationally drive the left and right tine assemblies, respectively;
drive means operatively connected between said engine and said differential and including means for transferring power from said engine to said differential; and
control means accessible by an operator walking behind said frame, said control means including means for continually adjusting a rotational speed of said drive means from a higher speed and through progressively reduced speeds to being completely stopped while said engine is operating at a constant speed; wherein the rotational speed of said drive means may be fixed at each of a plurality of said progressively reduced speeds during a plurality of rotations of said wheels.

2. A walk-behind soil aerator as recited in claim 1, wherein said control means, in addition to including means for continually adjusting the rotational speed of said drive means in the forward direction, also includes means for causing said drive means to operate in the reverse direction while said engine is operating at a constant speed.

3. A walk-behind soil aerator as recited in claim 2, wherein said control means includes a single manual control, which can be adjusted by an operator to continually adjust the rotational speed of said drive means in a forward direction and to cause the drive means to rotate in a reverse direction while said engine is operating at a constant speed.

4. A walk-behind soil aerator as recited in claim 1, wherein said drive means includes a hydraulic motor.

5. A walk-behind soil aerator as recited in claim 3, wherein said drive means includes a hydraulic motor.

6. A walk-behind soil aerator as recited in claim 5, wherein said control means includes a swashplate which controls the flow of fluid to said hydraulic motor.

7. A walk-behind soil aerator as recited in claim 6, wherein said plurality of wheels includes a left wheel which is driven by said first output shaft along with said left tine assembly and a right wheel which is driven by said second output shaft along with said right tine assembly.

8. A walk-behind soil aerator as recited in claim 6, and further comprising at least one central tine assembly located between the left and right tine assemblies, said central tine assembly being freewheeling for rotation about the same axis of rotation as the left and right tine assemblies.

9. A walk-behind soil aerator as recited in claim 8, wherein said left tine assembly includes two tine disks, each including a plurality of radially-extending tines, with the tines of the two tine disks being angularly offset from each other.

10. A walk-behind soil aerator as recited in claim 1, wherein said plurality of wheels includes a left wheel which is driven by said first output shaft along with said left tine assembly and a right wheel which is driven by said second output shaft along with said right tine assembly.

11. A walk-behind soil aerator as recited in claim 10, wherein said left wheel has a left wheel rotational axis coaxial with said first output shaft and said right wheel has a right wheel rotational axis coaxial with said second output shaft.

12. A method of aerating soil, comprising the steps of:
walking behind an aerator machine including a frame supported on the ground by a plurality of wheels, said frame supporting an engine which drives an engine shaft in a first direction, and including a variable speed reversible drive means that transmits power from the engine shaft to a differential having first and second output shafts, and further including left and right tine assemblies rotationally driven by said first and second output shafts, respectively;
steering the aerator machine by applying varying forces to a steering handle supported on said frame while walking behind the aerator machine; and
moving a single manual control which continually adjusts a speed at which the drive means drives the differential, from a higher speed and through progressively reduced speeds to being completely stopped while said engine is operating at a constant speed of rotation and while walking behind the aerator machine; wherein the speed at which the drive means drives the differential may be fixed at each of a plurality of said progressively reduced speeds during a plurality of rotations of said wheels.

13. The method of aerating soil as recited in claim 12, and further comprising the step of moving the same single manual control to reverse the direction in which the drive means drives the differential while said engine is operating at a constant speed.

14. The method of aerating soil as recited in claim 13, wherein said single manual control is a control handle pivotably mounted to the steering handle.

15. The method of aerating soil as recited in claim 14, wherein the steering handle has an inverted "V" shape.

16. The method of aerating soil as recited in claim 15, wherein the control handle also has an inverted "V" shape, which matches the shape of the steering handle.

* * * * *

UNITED STATES PATENT AND TRADEMARK OFFICE
CERTIFICATE OF CORRECTION

PATENT NO. : 8,291,991 B1
APPLICATION NO. : 12/644335
DATED : October 23, 2012
INVENTOR(S) : David M. Cook Page 1 of 1

It is certified that error appears in the above-identified patent and that said Letters Patent is hereby corrected as shown below:

Title Page 2, Column 2, under item (56) in "FOREIGN PATENT DOCUMENTS", line 3, the date "0/1910" should read --11/1910--.
Title Page 2, Column 2, under item (56) in "FOREIGN PATENT DOCUMENTS", line 4, the date "0/1911" should read --6/1911--.

In the Specification
Column 3, line 55, the reference numeral "258" should read --25B--.

Signed and Sealed this
Twenty-second Day of October, 2013

Teresa Stanek Rea
*Deputy Director of the United States Patent and Trademark Office*